United States Patent
Wozich et al.

(10) Patent No.: US 11,985,048 B2
(45) Date of Patent: May 14, 2024

(54) COMPUTERIZED SYSTEM AND METHOD FOR AN IMPROVED SELF ORGANIZING NETWORK

(71) Applicant: VERIZON PATENT AND LICENSING INC., Basking Ridge, NJ (US)

(72) Inventors: Zachary S. Wozich, Casco, ME (US); Vaughne Glymph, Pittsburgh, PA (US); Charles Aaron Robeck, Byron, MN (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

(21) Appl. No.: 18/192,253

(22) Filed: Mar. 29, 2023

(65) Prior Publication Data

US 2023/0231778 A1 Jul. 20, 2023

Related U.S. Application Data

(63) Continuation-in-part of application No. 17/361,379, filed on Jun. 29, 2021, now Pat. No. 11,652,699.

(51) Int. Cl.
*H04L 41/5009* (2022.01)
*H04L 43/062* (2022.01)
*H04L 43/065* (2022.01)

(52) U.S. Cl.
CPC ........ *H04L 41/5009* (2013.01); *H04L 43/062* (2013.01); *H04L 43/065* (2013.01)

(58) Field of Classification Search
CPC . H04L 41/5009; H04L 43/062; H04L 43/065; H04L 41/0836; H04L 41/145; H04L 41/0654; H04W 24/08; H04W 24/02
See application file for complete search history.

(56) References Cited

U.S. PATENT DOCUMENTS

| | | | |
|---|---|---|---|
| 9,407,656 B1* | 8/2016 | Roehl | H04L 63/1433 |
| 10,432,375 B1* | 10/2019 | Kang | H04W 72/52 |
| 2015/0281004 A1* | 10/2015 | Kakadia | H04L 41/5025 370/235 |
| 2017/0086084 A1* | 3/2017 | Jarvis | H04M 3/2236 |
| 2018/0139116 A1* | 5/2018 | Ricci | H04L 43/0876 |
| 2021/0351973 A1* | 11/2021 | Ford | H04L 43/067 |

* cited by examiner

*Primary Examiner* — John A Follansbee
*Assistant Examiner* — Fadi Haj Said

(57) ABSTRACT

Disclosed are systems and methods for a robust Self-Organizing Network (SON) framework that quantifies SON applications' control and management of a network into key performance indicators (KPI) that are leveraged to determine the impact of a SON application's effectiveness in regulating network parameters, which then dictates how the SON application operates. The disclosed framework is configured to receive multiple data streams from existing data sources, determine the performance of a node on a network, and then automatically perform SON operations based therefrom. The disclosed framework can utilize this information to predict additional and/or future opportunities for SON automation on the network, which can be based on an aggregate determination of a net performance gain (NPG) of the SON applications. The framework can leverage the NPG to modify, configure and/or further maintain network operations so as to improve control and management of the network and the applications operating thereon.

17 Claims, 5 Drawing Sheets

COMPUTERIZED SYSTEM AND METHOD FOR AN IMPROVED SELF ORGANIZING NETWORK

CROSS-REFERENCE TO RELATED APPLICATIONS

This application is a continuation-in-part (CIP) of U.S. patent application Ser. No. 17/361,379, filed on Jun. 29, 2021, which is incorporated by reference herein in its entirety.

BACKGROUND INFORMATION

A Self-Organizing Network (SON) is a collection of functions for automatic configuration, optimization and diagnostication of cellular networks. SON applications manage the configuration of network elements, and perform dynamic optimization and troubleshooting during operation.

BRIEF DESCRIPTION OF THE DRAWINGS

The features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION OF EXAMPLE EMBODIMENTS

Figure 1:
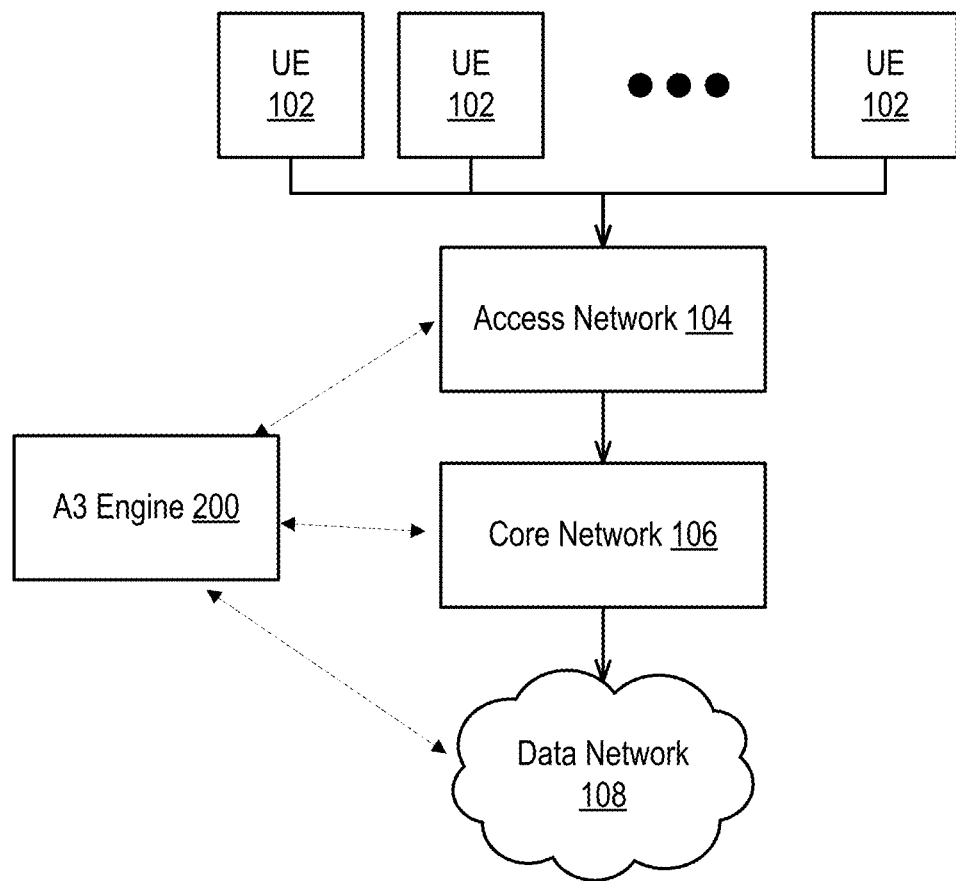
FIG. 1 is a block diagram of an example network architecture according to some embodiments of the present disclosure.

Cellular networks consist of thousands of parameters (e.g., managed objects) that must be configured in a certain manner in order to function correctly and in a manner that provides service to the user equipment (UE) that is connected.

SON applications are configured to automatically make thousands of parameter changes every day to maintain mobile availability and service to UE. For example, SON applications enable upgrades to be made to sites in a maintenance window, whereby engineers can adjust parameters to improve performance. SON applications also can provide alarms and/or detect faults on cellular equipment that can impact (e.g., degrade) service performance being provided to UEs.

The disclosed systems and methods provide a novel SON framework that quantifies a SON application's control and management of a network into key performance indicators (KPIs). For example, KPIs can indicate, but are not limited to, a Default Bearer Lost Call Rate, Radio Resource Control (RRC) set up failures, Downlink Throughput, and the like. KPIs can be leveraged to determine how particular components on a network are operating, and/or the impact of particular parameter controls, modifications and/or configurations performed by a SON application(s) operating on a network. For example, KPIs can indicate the effectiveness (or success) of an upgrade to a parameter, a parameter change (both automatic and manually performed), an alarm or fault provided by a SON application in addressing, fixing and/or improving a detected network characteristic. The disclosed framework can utilize this information to predict additional and/or future opportunities for SON automation.

In SON operating environments, KPIs can indicate a rate of success of a system change or identified diagnostic. KPIs can quantify the effectiveness of a SON application's performance in controlling, updating, changing and/or regulating operations of a cellular network.

For example, a KPI rate can involve performing the following calculation:

$$\text{KPI rate} = 100 \times (S/A), \quad \text{(Eq. 1)},$$

where S represents the number of successes from a specific SON operation (e.g., change or upgrade), and A represents a number of attempts by the SON application.

In another non-limiting example, a KPI can measure throughput for a network by measuring the number of megabits per second (Mb/s) that are currently being processed by a particular location/area. For example:

$$\text{KPI Mb/s} = (DV/T) \quad \text{(Eq. 2)},$$

where DV represents a data volume, and T represents time, which can be for a period of time or a current time value.

The above KPI equations are sample KPI metrics that can be calculated and utilized to determine the effectiveness of SON applications, which can then be optimized for identifying areas for further automation and control by the SON applications, as discussed below.

According to some embodiments, the disclosed KPI-based SON operation can result in a reduction of operational costs. As evident from the discussion below, this can involve improving algorithmic decision making, improving efficiency, identifying possibilities for additional automation, increasing return on investment (ROI) on a network, reducing the time network engineers spend searching and/or addressing issues by automating time consuming efforts and allowing engineers to focus on items that cannot be currently resolved through automation, for example, interference hunting, and the like.

Moreover, according to some embodiments, the KPI-based SON operations can be subject to a Net Performance Gain (NPG) analysis, which as provided herein, enables a computerized aggregation of network changes respective to the "net" impact a SON operation can have on the network and the communications occurring therein.

Conventional performance monitoring involves measuring trial clusters to identify which network environment require control. This, however, is a "post measurement," which occurs after the fact. That is, for example, after network alterations have occurred, their impact can be determined; however, this may have little to no impact on the network since the effective "alterations" have already occurred. Indeed, post measurements are not effective in quantifying SON application changes in production environments—by way of non-limiting example, the ability to control a network environment via existing post methods is limited due to thousands of SON changes occurring each cycle (e.g., each day).

As such, the disclosed NPG analysis and network configuration based therefrom enables the aggregation of both positive and negative SON operations (or changes) during such cycles. This, among other benefits, enables a determination as to whether a SON operation(s) is currently being effective. Thus, upon NPG detection, modification to SON operations and/or programming environments can be made "on the spot" rather than after the fact.

FIG. 1 is a block diagram of an example network architecture according to some embodiments of the present disclosure. In the illustrated embodiment, UE 102 accesses a data network 108 via an access network 104 and a core network 106. In the illustrated embodiment, UE 102 comprises any computing device capable of communicating with the access network 104. As examples, UE 102 may include mobile phones, tablets, laptops, sensors, Internet of Things (IoT) devices, autonomous machines, wired devices, wireless handsets, and any other devices equipped with a cellular or wireless or wired transceiver. One example of a UE is provided in FIG. 5.

In the illustrated embodiment, the access network 104 comprises a network allowing network communication with UE 102. In general, the access network 104 includes at least one base station that is communicatively coupled to the core network 106 and coupled to zero or more UE 102.

In some embodiments, the access network 104 comprises a cellular access network, for example, a fifth-generation (5G) network or a fourth-generation (4G) network. In one embodiment, the access network 104 and UE 102 comprise a NextGen Radio Access Network (NG-RAN). In an embodiment, the access network 104 includes a plurality of next Generation Node B (e.g., eNodeB and gNodeB) base stations connected to UE 102 via an air interface. In one embodiment, the air interface comprises a New Radio (NR) air interface. For example, in a 5G network, individual user devices can be communicatively coupled via an X2 interface.

In the illustrated embodiment, the access network 104 provides access to a core network 106 to the UE 102. In the illustrated embodiment, the core network may be owned and/or operated by a network operator (NO) and provides wireless connectivity to UE 102. In the illustrated embodiment, this connectivity may comprise voice and data services.

At a high-level, the core network 106 may include a user plane and a control plane. In one embodiment, the control plane comprises network elements and communications interfaces to allow for the management of user connections and sessions. By contrast, the user plane may comprise network elements and communications interfaces to transmit user data from UE 102 to elements of the core network 106 and to external network-attached elements in a data network 108 such as the Internet.

In the illustrated embodiment, the access network 104 and the core network 106 are operated by a NO. However, in some embodiments, the networks (104, 106) may be operated by a private entity and may be closed to public traffic. For example, the components of the network 106 may be provided as a single device, and the access network 104 may comprise a small form-factor base station. In these embodiments, the operator of the device can simulate a cellular network, and UE 102 can connect to this network similar to connecting to a national or regional network.

In some embodiments, the access network 104, core network 106 and data network 108 can be configured as a multi-access edge computing (MEC) network, where MEC or edge nodes are embodied as each UE 102, and are situated at the edge of a cellular network, for example, in a cellular base station or equivalent location. In general, the MEC or edge nodes may comprise UEs that comprise any computing device capable of responding to network requests from another UE 102 (referred to generally as a client) and is not intended to be limited to a specific hardware or software configuration a device.

FIG. 1 further includes engine 200 which is configured for performing anomaly detection, analytics and automation (A3). The A3 engine 200 can be a special purpose machine or processor, and could be hosted by or integrated into functionality associated with access network 104, core network 106 and/or data network 108, or some combination thereof. For example, A3 engine 200 can be configured to connect to and/or integrate with eNodeB and gNodeB components (of access network 104) that connect core network 106 to UE 102. In another example, A3 engine 200 can be hosted on a 4G or 5G Core—e.g., on network 106.

In some embodiments, engine 200 can be hosted by any type of network server, such as, but not limited to, an edge node or server, application server, content server, web server, and the like, or any combination thereof.

Figure 2:
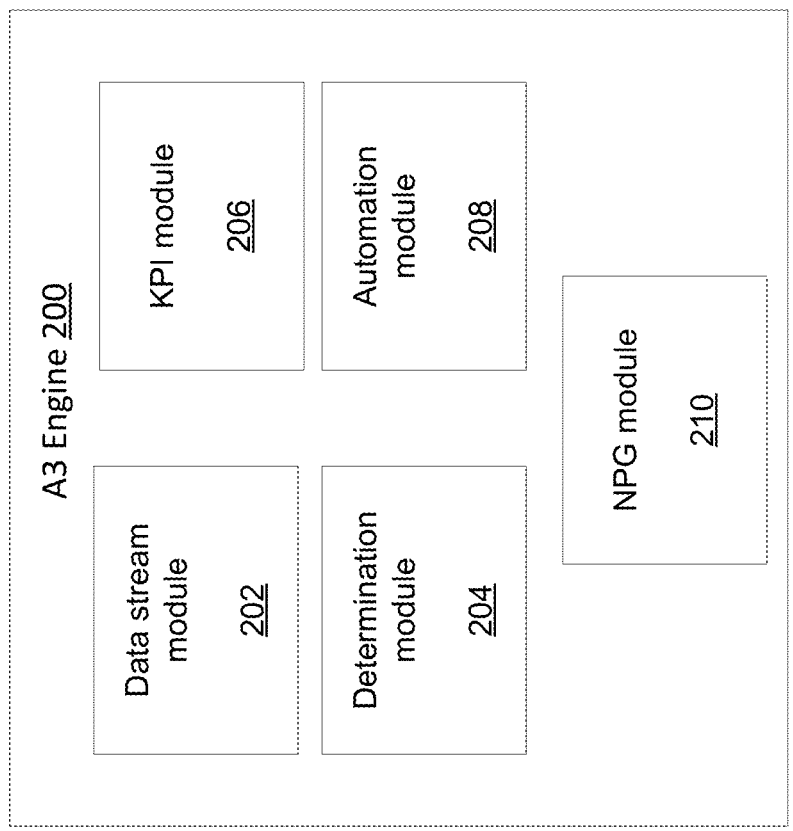
FIG. 2 is a block diagram of illustrating components of an exemplary system according to some embodiments of the present disclosure.

As depicted in FIG. 2, A3 engine 200 is configured to receive (e.g., collect, ingest and/or monitor) data from existing data sources, determine the performance of a node on a network, and then perform SON operations based on the determined performance metrics. In some embodiments, A3 engine 200 can include, but is not limited to, data stream module 202, determination module 204, KPI module 206, automation module 208 and NPG module 210. In some embodiments, as discussed below, data stream module 202 can receive the network data, which can be analyzed by determination module 204 and KPI module 206, which can result in the automation of specific SON operations (or tasks) via automation module 208. Moreover, in some embodiments, NPG module 210 can analyze and determine performance metrics for the automated SON operations, which can be leveraged by the automation module 208 to adjust, modify, maintain and/or configure such tasks and/or other tasks, as discussed in more detail below.

In some embodiments, the data received by data stream module 202 can include and/or be related to, but not limited to, anomalies on a network, network analytics, SON application operations, site configurations, network management data, rogue mobile application data, broken cell detections, change logs, alarms, faults, and/or any other type of network connectivity data, SON application data or big data associated with networks 104-108 and UE 102, and the like. In some embodiments, the received data can include KPI data and/or Delta-V data, as discussed below in relation to FIG. 3. The received data can provide indications of network characteristics of parameters, components and/or UE of a network, as discussed below.

In some embodiments, as discussed below, determination module 204 can analyze this received data and determine instances, situations or opportunities for SON operations and/or optimization. For example, determination module 204 can detect an alarm associated with a piece of cellular equipment, and determine whether a SON application can address the issue, or whether an alert should be sent to a network engineer.

In some embodiments, determination module 204 can perform its operations by executing a SON application, such as, but not limited to, distributed SON (D-SON), centralized SON (C-SON) and/or Hybrid SON, and/or any of their existing sub-functions. In some embodiments, determination module 204 can also and/or alternatively use any type of known or to be known computational analysis algorithm, technique or technology to analyze the data traffic received by module 202, such as, for example, autoregressive integrated moving average (ARIMA), neural networks, logistic regression, classifiers, data mining, machine learning (ML) models and artificial intelligence (AI), and the like.

In some embodiments, the determination module 204 can analyze the output of the KPI module 206 to enable parameter control and configurations, as discussed below. In some embodiments, as discussed below, module 204 can execute an anomaly detection algorithm, such as, for example, seasonal autoregressive integrated moving average (SA-RIMA).

Further detail of the operation of determination module 204 will be discussed below in relation to FIG. 3.

In some embodiments, as discussed above, KPI module 206 determines a quantified value for operations executing on a network, and/or a quantified value of the status of the network and its components operating thereon. KPI computations were discussed above, and further detail of the operation of KPI module 206 will be discussed below in relation to FIG. 3.

In some embodiments, automation module 208 provides an output that can control how SON applications execute on a network (e.g., which SON application to trigger, and/or which sub-function to execute), which can also enable network engineers to efficiently address situations that are currently not capable of being remotely handled by an existing SON application. For example, automation module 208 can determine that a hardware issue is present on cellular equipment at a location, therefore a network engineer can be alerted. In another non-limiting example, module 208 can detect a hacking attempt on an enterprise network, and rather than assigning an engineer to check the situation, a self-protection sub-function can be scheduled to be rolled-out overnight.

Figure 3:
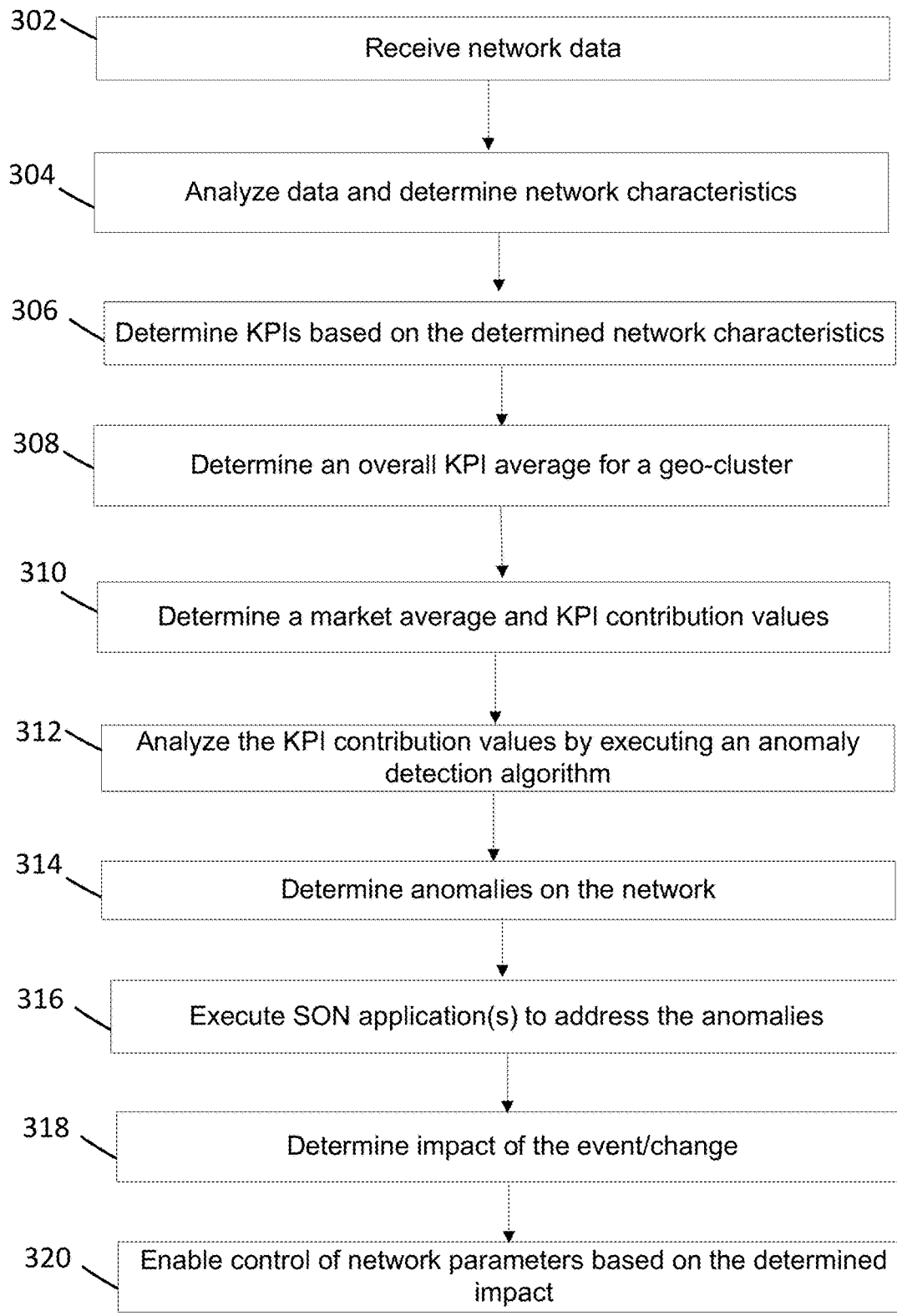
FIG. 3 illustrates an exemplary workflow according to some embodiments of the present disclosure.

In some embodiments, NPG module 210 provides an NPG measure of the performance of the SON application(s) that are/were enabled and provided via automation module 208 (as discussed at least in relation to FIG. 3, infra). Accordingly, in some embodiments, NPG module 210 can measure KPI values of SON changes and determine whether such changes had a positive or negative impact. As provided below in relation to at least FIG. 4, the determined attribution by NPG module 210 can be leveraged by automation module 208 to further control, manage and/or update SON applications executing on the network.

In some embodiments, A3 engine 200 can be connected to a database or data store (not shown). The database can store information collected, processed and/or determined from the computations performed by each module 202-210. Such information can include data and metadata associated with local and/or network traffic information related to enterprises, users, UEs, services, applications, content and the like.

It should be understood that the engine(s) and modules discussed herein are non-exhaustive, as additional or fewer engines and/or modules (or sub-modules) may be applicable to the embodiments of the systems and methods discussed. More detail of the operations, configurations and functionalities of engine 200 and each of its modules, and their role within embodiments of the present disclosure will be discussed below in relation to FIGS. 3 and 4.

FIG. 3 provides Process 300 which details non-limiting example embodiments of the A3 engine 200's implementation for dictating how SON applications are implemented in a network environment to control, maintain and troubleshoot network parameters.

According to some embodiments, Step 302 of Process 300 can be performed by data stream module 202 of A3 engine 200; Steps 304, 312-314 and 318 can be performed by determination module 204; Steps 306-310 can be performed by KPI module 206; and Steps 316 and 320 can be performed by automation module 208.

Process 300 begins with Step 302 where network data is received. According to some embodiments, engine 200 can monitor the network for a predetermined period of time (e.g., 24 hours) and collect data and/or metadata related to the operation of the network and/or its components operating thereon.

In Step 304, the network data is analyzed, from which network characteristics are identified. Network characteristics, as discussed above, can include, but are not limited to, bandwidth, latency, measurements, signal strength, outages, alerts, alarms, locations, frequency, and the like, and/or any other type of network data related to UE 102 and/or networks 104-108.

In some embodiments, for example, the analysis and/or identification (or determination) of network characteristics can be performed by engine 200 operating sub-functions of a SON application (e.g., self-optimization function which performs measurements of network behavior at a base station). In some embodiments, AI or ML models, as mentioned above, can be utilized to detect, calculate and/or classify a type of characteristic.

In Step 306, KPIs are determined based on the determined network characteristics. As discussed above, KPIs provide values or data that indicate how operations are performing on the network. Non-limiting examples of determined KPI values are discussed above in relation to Equations 1 and 2.

In Step 308, engine 200 determines an overall KPI average for a geo-cluster. Step 308 involves engine 200 analyzing the network characteristic data and identifying a geographic area, then clustering the KPI data for that area. A geo-cluster, therefore, is the KPI data for the identified geographic area. Engine 200 then determines an overall average of the KPIs for each UE (or cell) operating within the geo-cluster. This, for example, will enable the identification of a metric that indicates how a particular region's service is operating (e.g., rural area versus an urban area).

In Step 310, engine 200 determines (or calculates) a market average for the geo-cluster, and determines KPI contribution values for each UE operating within the cluster.

According to some embodiments, Step 310's calculation involves performing Delta-V operations in order to determine the market average and then KPI contribution values. In some embodiments, these operations involve removing KPI data for each particular UE and recalculating an average for the geo-cluster. This enables the determination of which UEs are pulling down the overall average the most (i.e., contribution value).

For example, engine 200 calculates the overall KPI average for a geo-cluster (Step 308). In this example, KPI data is based on 3 cells (Cell 1, Cell 2, Cell 3). Then, in Step 310, a market average is calculated by determining what the average would be with each cell removed. For example, a market average is determined by removing KPI data for Cell 1 and determining an average based on KPI data for Cell 2 and Cell 3. The same operation is performed by removing KPI data for Cell 2, calculating the average of KPI data for Cells 1 and 3; then removing KPI data for Cell 3, and calculating the average of KPI data for Cells 1 and 2.

Engine 200 then determines each cell's KPI contribution value, as follows:

KPI contribution value ($C_n$)=Overall Average−Market Average with $C_n$ removed (Eq. 3), where $C_n$ represents n cells in a geo-cluster.

In some embodiments, the market average and KPI contribution values can be performed for only a portion of UEs (or cells) operating within a geo-cluster. In some embodiments, the portion can correspond to a top n or bottom n UEs, which is based on KPI data being compared to a threshold that indicates how the UE is operating in view of other UEs within a geo-cluster. In some embodiments, the market average and KPI contribution values can be performed for all UEs (or cells) operating within an geo-cluster. In some embodiments, once the KPI contribution values are determined, a portion can be filtered out based on their KPI contribution values being below a threshold value.

In some embodiments, Step 310 can result in a sorted list of UEs (or cells) based on each UEs KPI contribution value. For example, the UEs with greater KPI contribution values can be listed higher or sequentially before other UEs with lower KPI contribution values.

In Step 312, engine 200 analyzes each of the KPI contribution values by executing an anomaly detection algorithm, such for example, SARIMA, as discussed above.

In some embodiments, engine 200 can use the market average data and KPI contribution values (from Step 310) to determine an Auto-ARIMA model to utilize for Step 312. In some embodiments, this can involve engine 200 analyzing the data from Step 310 to determine a pattern of the KPI contribution values for the geo-cluster, then identifying the Auto-ARIMA model with the lowest error (e.g., an Akaike Information Criterion (AIC) value, for example). Based on the error value, engine 200 can forecast or predict the model (e.g., SARIMA) that can identify anomalies on the network for which the proper SON applications (and/or sub-functions) can be called, as discussed below.

As a result of Step 312's execution, in Step 314, anomalies on the network can be detected. In some embodiments, these can correspond to current anomalies (e.g., anomalies that have been detected during the data reception time period (from Step 302)). In some embodiments, anomalies can be identified to be within a standard accepted variation level and/or outside accepted variation levels implementing Upper Control Limits (UCL) and Lower Control Limits (LCL).

In some embodiments, information related to the detected anomalies (e.g., the source and/or cause of the anomaly, the KPI data, and/or other network characteristics related to the anomaly, and the like) can be stored in a database.

In Step 316, engine 200 identifies and executes a SON application(s) to address the detected anomalies. In some embodiments, can involve the SON application executing an event by calling a proper sub-functions and/or combination of SON applications. As discussed above, the event can involve the SON application altering and/or updating parameters of the network to fix the anomalies.

In Step 318, engine 200 then determines whether the event (or change or fix) associated with the network parameters had a positive impact to the network (e.g., improved network characteristics) or a negative impact to the network (e.g., degraded network characteristics, or stayed the same). In some embodiments, this can involve receiving network data related to the components involved in the event (e.g., updated parameters from Step 316) and analyzing their network characteristics in a similar manner as discussed above in relation to Steps 302-304. This can provide measurements that can indicate or gauge how the network is operating after the event executed in Step 316.

As a result of Step 320, control of the network parameters and/or operations of the components operating on the network can be enabled and provided to A3 engine 200 based on the determined impact. In some embodiments, Step 320 can perform the operations of automation module 208, as discussed above. The operations of automation module 208, which can involve executing a SON application or alerting a network engineer, depend on a type of parameter and/or network characteristic that needs addressing, as discussed above.

In some embodiments, Step 320 can involve returning impact data to SON applications and/or training SON applications based on the determined impact of an executed event, which can then be used for future parameter changes/updates. This, as mentioned above, can be utilized for facilitate improved (e.g., learned) algorithm decision making by SON applications. In some embodiments, Step 320 can involve compiling and outputting information indicating Step 318's determination on an engineering level dashboard and/or an executive level dashboard. The dashboards, therefore, can display information related to the detected anomalies, such as, for example, the source and/or cause of the anomaly, the KPI data, the executed event, the determined impact, and/or other network characteristics related to the anomaly, and the like.

Figure 4:
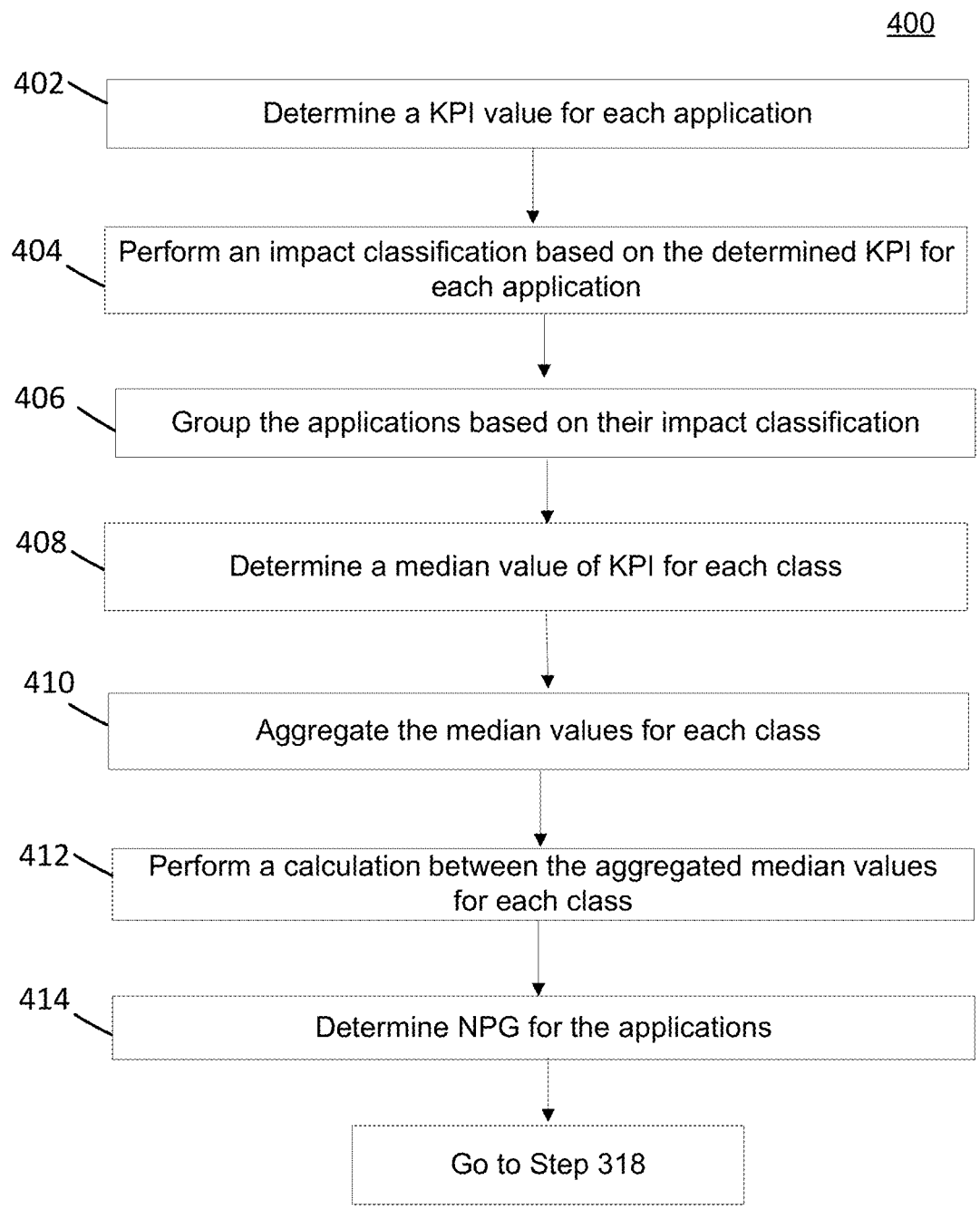
FIG. 4 illustrates an exemplary workflow according to some embodiments of the present disclosure.

FIG. 4 depicts Process 400 which details non-limiting example embodiments for the performance of an NPG analysis. As discussed herein, Process 400 can involve the aggregation of positive and negative SON operations, which provides indicators as to whether a SON operation(s) is currently being effective. Thus, upon detection, modification to SON operations and/or programming environments can be effectuated.

According to some embodiments, Steps 402-414 of Process 400 can be performed by NPG module 210 of A3 engine 200.

According to some embodiments, Process 400 begins with Step 402 where engine 200 can determine a KPI value for each application (e.g., an application per cluster, for example, as discussed above). According to some embodiments, the KPI value determinations can be performed based on the SON applications caused to be executed in Step 320, as discussed above. Accordingly, the determination of the KPI values can be performed in a similar manner as discussed above at least in relation to Steps 306-308.

In Step 404, engine 200 can perform an impact classification based on the determined KPI for each application. According to some embodiments, the KPI value for an application can be either positive or negative. Therefore, in Step 404, engine 200 can classify an application as having a positive or negative impact based on the application's respective KPI value. For example, if the KPI value evidences a degradation of performance, the application can be classified as having a negative impact (and vice versa for a positive impact).

In Step 406, engine 200 can group (or cluster) the applications based on their impact classification. In some embodiments, for example, applications classified as positive can be grouped together, and applications classified as negative can be grouped together. In some embodiments, the classification can be based on further criteria, which can include, but is not limited to, a type of application, time period of KPI determinations (e.g., daily), and the like.

In Step 408, engine 200 can determine a median (or predetermined percentage value—for example, 50%) of the KPI value for each class. For example, the KPI values for each application within the positive grouping can be analyzed, whereby a median value can be determined. A similar computation can be performed for the negative class grouping. In some embodiments, engine 200 can execute a Lag function based on the KPI values per grouping.

In Step 410, engine 200 can aggregate the median values for each class. For example, positive KPI values for three different SON applications can be leveraged to identify each class of application's median value, which can then be aggregated. Similarly, a related computation can be performed for a class of applications identified as negative. For example, KPI values for an application for n distinct days can be analyzed, whereby their median values (per day) can be aggregated via engine 200.

In Step 412, engine 200 can perform a calculation between the aggregated median values for each class. For example, the aggregated KPI/A3 median values classified as positive (from Step 410) can be subject to a subtraction computation by the aggregated KPI/A3 median values classified as negative. As a result of such computation, engine 200 can determine the NPG for the application, as in Step 414.

Accordingly, as discussed above and depicted in FIG. 4, processing can proceed from Step 414 recursively back to Step 318 of Process 300, where engine 200 can leverage the determined NPG value/metric to control and manage and/or modify the executed SON applications. For example, if the applications executed in Step 320 are determined to have a negative NPG value, then the SON applications can be modified (e.g., alter how they execute and/or utilized different applications) via execution of Steps 318-320. In another non-limiting example, if the applications have a positive NPG value, yet are below a threshold NPG value, then Step 318-320 can be re-executed to improve the application/network performance. Similarly, even with a positive NPG value over the threshold, engine 200 can recursively analyze the applications/network (according to a time period and/or at the conclusion of a time period) to determine how to improve network performance, which can be performed via the steps of Process 300, as discussed above.

Figure 5:
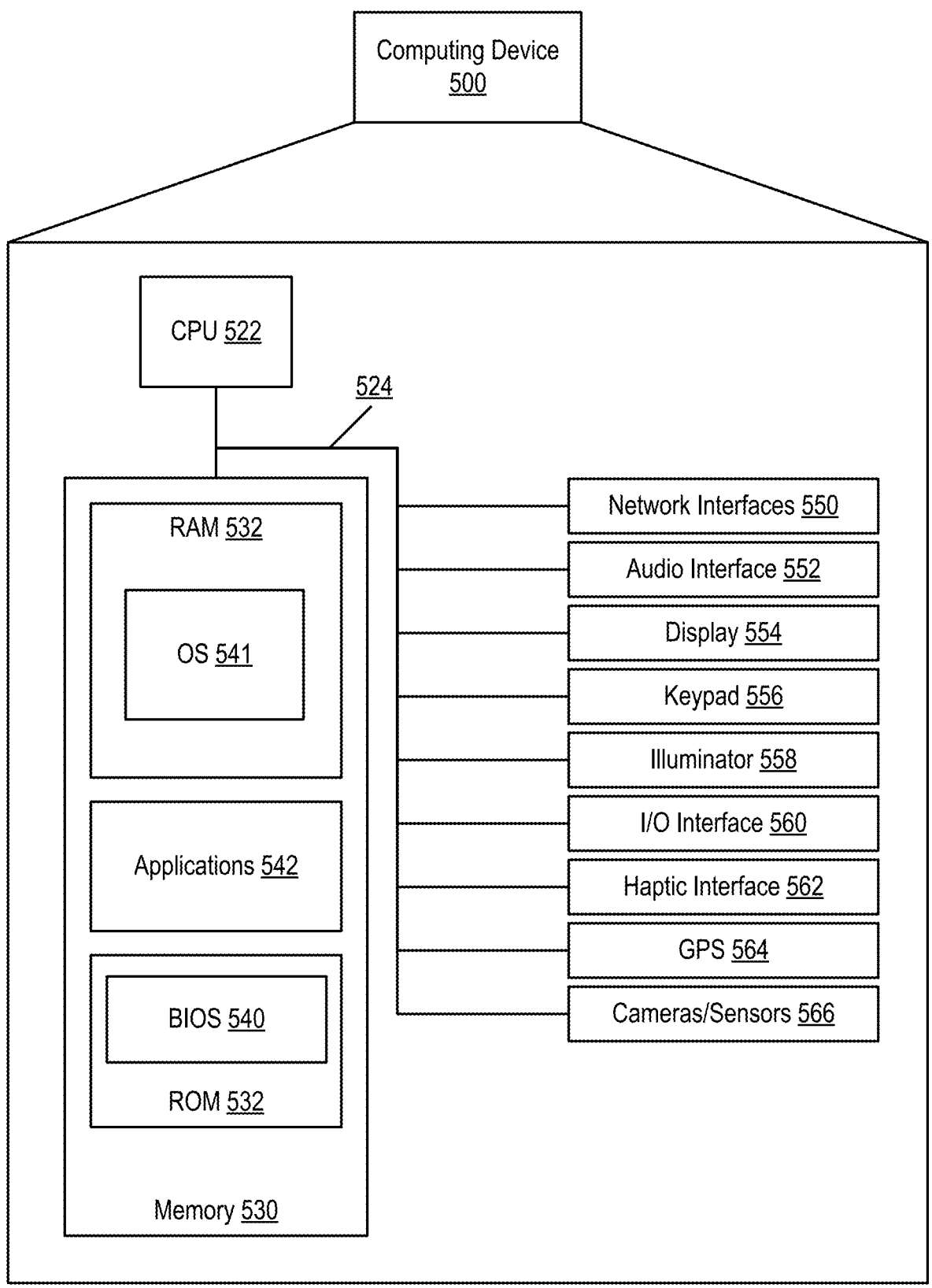
FIG. 5 is a block diagram illustrating a computing device showing an example of a client or server device used in various embodiments of the present disclosure.

FIG. 5 is a block diagram illustrating a computing device showing an example of a client or server device used in the various embodiments of the disclosure.

The computing device 500 may include more or fewer components than those shown in FIG. 5, depending on the deployment or usage of the device 500. For example, a server computing device, such as a rack-mounted server, may not include audio interfaces 552, displays 554, keypads 556, illuminators 558, haptic interfaces 562, GPS receivers 564, or cameras/sensors 566. Some devices may include additional components not shown, such as graphics processing unit (GPU) devices, cryptographic co-processors, artificial intelligence (AI) accelerators, or other peripheral devices.

As shown in FIG. 5, the device 500 includes a central processing unit (CPU) 522 in communication with a mass memory 530 via a bus 524. The computing device 500 also includes one or more network interfaces 550, an audio interface 552, a display 554, a keypad 556, an illuminator 558, an input/output interface 560, a haptic interface 562, an optional global positioning systems (GPS) receiver 564 and a camera(s) or other optical, thermal, or electromagnetic sensors 566. Device 500 can include one camera/sensor 566 or a plurality of cameras/sensors 566. The positioning of the camera(s)/sensor(s) 566 on the device 500 can change per device 500 model, per device 500 capabilities, and the like, or some combination thereof.

In some embodiments, the CPU 522 may comprise a general-purpose CPU. The CPU 522 may comprise a single-core or multiple-core CPU. The CPU 522 may comprise a system-on-a-chip (SoC) or a similar embedded system. In some embodiments, a GPU may be used in place of, or in combination with, a CPU 522. Mass memory 530 may comprise a dynamic random-access memory (DRAM) device, a static random-access memory device (SRAM), or a Flash (e.g., NAND Flash) memory device. In some embodiments, mass memory 530 may comprise a combination of such memory types. In one embodiment, the bus 524 may comprise a Peripheral Component Interconnect Express (PCIe) bus. In some embodiments, the bus 524 may comprise multiple busses instead of a single bus.

Mass memory 530 illustrates another example of computer storage media for the storage of information such as computer-readable instructions, data structures, program modules, or other data. Mass memory 530 stores a basic input/output system ("BIOS") 540 for controlling the low-level operation of the computing device 500. The mass memory also stores an operating system 541 for controlling the operation of the computing device 500.

Applications 542 may include computer-executable instructions which, when executed by the computing device 500, perform any of the methods (or portions of the methods) described previously in the description of the preceding Figures. In some embodiments, the software or programs implementing the method embodiments can be read from a hard disk drive (not illustrated) and temporarily stored in RAM 532 by CPU 522. CPU 522 may then read the software or data from RAM 532, process them, and store them to RAM 532 again.

The computing device 500 may optionally communicate with a base station (not shown) or directly with another computing device. Network interface 550 is sometimes known as a transceiver, transceiving device, or network interface card (NIC).

The audio interface 552 produces and receives audio signals such as the sound of a human voice. For example, the audio interface 552 may be coupled to a speaker and microphone (not shown) to enable telecommunication with others or generate an audio acknowledgment for some action. Display 554 may be a liquid crystal display (LCD), gas plasma, light-emitting diode (LED), or any other type of display used with a computing device. Display 554 may also include a touch-sensitive screen arranged to receive input from an object such as a stylus or a digit from a human hand.

Keypad 556 may comprise any input device arranged to receive input from a user. Illuminator 558 may provide a status indication or provide light.

The computing device 500 also comprises an input/output interface 560 for communicating with external devices, using communication technologies, such as USB, infrared, Bluetooth™, or the like. The haptic interface 562 provides tactile feedback to a user of the client device.

The optional GPS transceiver 564 can determine the physical coordinates of the computing device 500 on the surface of the Earth, which typically outputs a location as latitude and longitude values. GPS transceiver 564 can also employ other geo-positioning mechanisms, including, but not limited to, triangulation, assisted GPS (AGPS), E-OTD, CI, SAI, ETA, BSS, or the like, to further determine the physical location of the computing device 500 on the surface of the Earth. In one embodiment, however, the computing device 500 may communicate through other components, provide other information that may be employed to determine a physical location of the device, including, for example, a MAC address, IP address, or the like.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

To the extent the aforementioned implementations collect, store, or employ personal information of individuals, groups, or other entities, it should be understood that such information shall be used in accordance with all applicable laws concerning the protection of personal information. Additionally, the collection, storage, and use of such information can be subject to the consent of the individual to such activity, for example, through well known "opt-in" or "opt-out" processes as can be appropriate for the situation and type of information. Storage and use of personal information can be in an appropriately secure manner reflective of the type of information, for example, through various access control, encryption, and anonymization techniques (for especially sensitive information).

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

What is claimed is:

1. A method comprising:
   identifying, by a device, network data corresponding to an application executing on a network, the application comprising functionality for controlling an event occurring on the network;
   analyzing, by the device, the network data, and determining, based on the analysis, a set of key performance indicator (KPI) values, the KPI values corresponding to the control of the event;
   performing, by the device, an impact classification for the set of KPI values of the application, the impact classification corresponding to at least one of a positive impact and a negative impact classification of each of the KPI values;
   analyzing, by the device, the classified set of KPI values;
   determining, by the device, a median value for each classification;

aggregating, by the device, the classified KPI values based on the median value for each classification;
determining, by the device, a network performance gain (NPG) of the application based on analysis of the aggregated and classified KPI values; and
executing, by the device, a Self-Organizing Network (SON) application based on the NPG, the execution of the SON application comprising control and management of the network data.

2. The method of claim 1, further comprising:
performing the analysis of the aggregated and classified KPI values; and
determining, based on the performed analysis, a difference between KPI values classified as positive and KPI values classified as negative, wherein the NPG is based on the determined difference.

3. The method of claim 1, wherein the control and management of the network data comprises modifying execution of the application when the NPG is at least below a NPG threshold.

4. The method of claim 1, wherein the control and management of the network data comprises executing another application when the NPG is at least below a NPG threshold.

5. The method of claim 1, wherein the KPI values are grouped negative when the KPI values correspond to a negative impact of the application on the network data.

6. The method of claim 1, wherein the KPI values are grouped positive when the KPI values correspond to a positive impact of the application on the network data.

7. The method of claim 1, further comprising:
determining, by the device, an impact of the application on the network data, the impact indicating whether network characteristics of the network data improved or degraded as a result of the event, wherein the impact classification is based on the determined impact.

8. The method of claim 1, wherein the determination of the set of KPI values are based on a time period, wherein the set of KPI values comprise at least two subsets of KPI values.

9. The method of claim 1, wherein the application controlling the event from which the network data is identified is a SON application.

10. A device comprising:
a processor configured to:
identify network data corresponding to an application executing on a network, the application comprising functionality for controlling an event occurring on the network;
analyze the network data, and determine, based on the analysis, a set of key performance indicator (KPI) values, the KPI values corresponding to the control of the event;
perform an impact classification for the set of KPI values of the application, the impact classification corresponding to at least one of a positive impact and a negative impact classification of each of the KPI values;
analyze the classified set of KPI values;
determine a median value for each classification;
aggregate the classified KPI values based on the median value for each classification;
determine a network performance gain (NPG) of the application based on analysis of the aggregated and classified KPI values; and
execute a Self-Organizing Network (SON) application based on the NPG, the execution of the SON application comprising control and management of the network data.

11. The device of claim 10, wherein the processor is further configured to:
perform the analysis of the aggregated and classified KPI values; and
determine, based on the performed analysis, a difference between KPI values classified as positive and KPI values classified as negative, wherein the NPG is based on the determined difference.

12. The device of claim 10, wherein the control and management of the network data comprises modifying execution of the SON application when the NPG is at least below a NPG threshold.

13. The device of claim 10, wherein the processor is further configured to:
determine an impact of the application on the network data, the impact indicating whether network characteristics of the network data improved or degraded as a result of the event, wherein the impact classification is based on the determined impact.

14. A non-transitory computer-readable medium tangibly encoded with instructions, that when executed by a processor of a device, perform a method comprising:
identifying, by the device, network data corresponding to an application executing on a network, the application comprising functionality for controlling an event occurring on the network;
analyzing, by the device, the network data, and determining, based on the analysis, a set of key performance indicator (KPI) values, the KPI values corresponding to the control of the event;
performing, by the device, an impact classification for the set of KPI values of the application, the impact classification corresponding to at least one of a positive impact and a negative impact classification of each of the KPI values;
analyzing, by the device, the classified set of KPI values;
determining, by the device, a median value for each classification;
aggregating, by the device, the classified KPI values based on the median value for each classification;
determining, by the device, a network performance gain (NPG) of the application based on analysis of the aggregated and classified KPI values; and
executing, by the device, a Self-Organizing Network (SON) application based on the NPG, the execution of the SON application comprising control and management of the network data.

15. The non-transitory computer-readable medium of claim 14, further comprising:
performing the analysis of the aggregated and classified KPI values; and
determining, based on the performed analysis, a difference between KPI values classified as positive and KPI values classified as negative, wherein the NPG is based on the determined difference.

16. The non-transitory computer-readable medium of claim 14, wherein the control and management of the network data comprises modifying execution of the SON application when the NPG is at least below a NPG threshold.

17. The non-transitory computer-readable medium of claim 14, further comprising:
determining, by the device, an impact of the application on the network data, the impact indicating whether network characteristics of the network data improved or degraded as a result of the event, wherein the impact classification is based on the determined impact.

* * * * *